(12) United States Patent
Wada

(10) Patent No.: US 8,333,473 B2
(45) Date of Patent: Dec. 18, 2012

(54) WEARING CONDITION PARAMETER MEASUREMENT DEVICE FOR SPECTACLE LENS AND WEARING CONDITION PARAMETER MEASUREMENT METHOD FOR SPECTACLE LENS

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/051,587

(22) Filed: Mar. 18, 2011

(65) Prior Publication Data

US 2011/0242481 A1    Oct. 6, 2011

(30) Foreign Application Priority Data

Mar. 30, 2010  (JP) ................. 2010-077507

(51) Int. Cl.
  *A61B 3/10* (2006.01)
  *A61B 3/04* (2006.01)
(52) U.S. Cl. ...................... 351/204; 351/227
(58) Field of Classification Search .............. 351/204, 351/222, 223, 227, 245
See application file for complete search history.

(56) References Cited

U.S. PATENT DOCUMENTS

| 4,391,527 A * | 7/1983 | Hennequin .................. 356/614 |
| 6,827,443 B2 | 12/2004 | Fisher et al. ................. 351/209 |
| 2009/0021693 A1 * | 1/2009 | Sessner et al. ............... 351/204 |

FOREIGN PATENT DOCUMENTS

| JP | 2003-523244 | 8/2003 |
| JP | 2007-003923 | 1/2007 |
| JP | 2008-521027 | 6/2008 |
| WO | WO 2006/054985 A1 | 5/2006 |

* cited by examiner

*Primary Examiner* — Ricky Mack
*Assistant Examiner* — Mahidere Sahle
(74) *Attorney, Agent, or Firm* — DLA Piper LLP (US)

(57) ABSTRACT

A wearing condition parameter measurement device for a spectacle lens adapted to measure a wearing condition parameter necessary for manufacturing spectacles includes a mirror having a mirror surface adapted to reflect the wearing condition of a wearer of the spectacle lens, an imaging camera adapted to simultaneously shoot the wearer and the mirror surface reflecting the wearer to obtain a shot image, and a calculation device adapted to calculate the wearing condition parameter based on the shot image obtained by the imaging camera.

4 Claims, 11 Drawing Sheets

WEARING CONDITION PARAMETER MEASUREMENT DEVICE FOR SPECTACLE LENS AND WEARING CONDITION PARAMETER MEASUREMENT METHOD FOR SPECTACLE LENS

BACKGROUND

1. Technical Field

The present invention relates to a wearing condition parameter measurement device for a spectacle lens and a wearing condition parameter measurement method for spectacle lenses for measuring various parameters used for manufacturing a spectacle lens suitable for a spectacle wearer.

2. Related Art

When performing spectacle adjustment on a spectacle wearer, "fitting" for measuring various parameters for adapting the spectacle information (optometry information, frame information, spectacle lens information) to the individual (the figure and the size of the face, the thickness of the neck, the relative positions and the shapes of the nose, the ear, and the eyes) is performed.

There have ever been proposed various methods for measuring such various parameters as described above (see, e.g., JP-A-2007-3923 (Document 1)).

According to Document 1, the spectacle wearer is set at a position where the spectacle wearer is in a distance vision state or a near vision state, and the spectacle wearer is shot with a front imaging camera disposed in front of the spectacle wearer and a side imaging camera disposed on the side of the spectacle wearer. Then, using a device control terminal, various parameters are measured or calculated from the shot image thus shot as described above.

However, according to Document 1, the measurement is performed in the condition in which the chin of the spectacle wearer is mounted on a chin support, and the forehead thereof is pressed against a forehead rest, namely in the condition of fixing the face. When looking at an object, we turn the head, turn the eyes, or change the posture (hereinafter referred to as a visual motion) in order for looking right or left, or up or down. Since we fail to perform the natural visual motion in the condition of fixing the face, the measurement of the spectacle wearer in a natural condition in daily life is not achievable. Therefore, it is difficult to design the spectacle lenses comfortable for the spectacle wearer.

Further, in Document 1, since the two cameras, namely the front imaging camera and the side imaging camera, are used, there arises a problem that the calibration needs to be performed two times, which costs time and money.

SUMMARY

An advantage of some aspects of the invention is to provide a wearing condition parameter measurement device for spectacle lenses and a wearing condition parameter measurement method for spectacle lenses capable of easily measuring the various parameters used for manufacturing the spectacle lenses more comfortable for a spectacle wearer.

According to an aspect of the invention, there is provided a wearing condition parameter measurement device for a spectacle lens adapted to measure a wearing condition parameter necessary for manufacturing spectacles includes at least one mirror having a mirror surface adapted to reflect the wearing condition of a wearer, an imaging camera adapted to simultaneously shoot the wearer and the mirror surface reflecting the wearer to obtain a shot image, and a calculation device adapted to calculate the wearing condition parameter based on the shot image obtained by the imaging camera, wherein the mirror is disposed so that an angle formed between a plane having an optical axis of the imaging camera as a normal line and the mirror surface is one of equal to and larger than 30° and one of equal to and smaller than 60°.

According to this aspect of the invention, the wearing condition of the wearer viewed from the direction of disposing the imaging camera and the wearing condition of the wearer viewed from a direction different from the direction of disposing the imaging camera, which is reflected on the mirror surface of the mirror, can be shot simultaneously with a single imaging camera. Therefore, the process such as calibration necessary in the case of shooting the wearing conditions in a plurality of directions with respective imaging cameras can be simplified. Further, since the time and effort can be saved, the various parameters can easily be measured without causing the customer pain.

In the wearing condition parameter measurement device for a spectacle lens of the above aspect of the invention, it is preferable that the angle formed between the plane having the optical axis of the imaging camera as the normal line and the mirror surface of the mirror is 45°.

According to this configuration of the invention, since the angle formed between the plane having the optical axis of the imaging camera as the normal line and the mirror surface of the mirror is 45°, the wearing condition of the wearer viewed from the direction perpendicular to the optical axis of the imaging camera can be shot.

In the wearing condition parameter measurement device for a spectacle lens of the above aspect of the invention, it is preferable that the mirror is a side mirror reflecting the wearing condition viewed from the side of the head of the wearer.

According to this configuration of the invention, by reflecting the wearing condition viewed from the side of the head of the wearer on the side mirror, the wearing condition viewed from the front of the wearer and the wearing condition viewed from the side of the head of the wearer can simultaneously be shot by the imaging camera. Further, based on the shot image, the wearing condition parameter related to the wearing condition viewed from the front of the wearer and the wearing condition parameter related to the wearing condition viewed from the side of the head of the wearer can be calculated with the calculation device.

It should be noted that it is also possible to dispose the side mirror on both sides of the wearer, or on either one of the sides. Further, if the wearer inclines his or her head, it is also possible to move the mirror or rotate the mirror with respect to the optical axis of the imaging camera in accordance with the inclination of the head so that the wearing condition viewed from the side of the head of the wearer can be shot from the front of the wearer.

In the wearing condition parameter measurement device for a spectacle lens of the above aspect of the invention, it is preferable that the mirror surface of the side mirror is provided with a scale used as a target for measuring the wearing condition parameter.

According to this configuration of the invention, the scale corresponding to the type of the parameter desired to be measured is formed on the mirror surface. According to this configuration, providing the wearing condition viewed from the side of the wearer is reflected on the mirror surface, the parameter can be measured by comparing the wearer reflected on the mirror surface with the scale. Therefore, since there is no need for performing the parameter calculation based on the image, the measurement result can be obtained more easily and promptly.

In the wearing condition parameter measurement device for a spectacle lens of the above aspect of the invention, it is preferable that the mirror is a top mirror reflecting the wearing condition viewed from the top of the head of the wearer.

According to this configuration of the invention, by reflecting the wearing condition viewed from the top of the head of the wearer on the top mirror, the wearing condition viewed from the front of the wearer and the wearing condition viewed from the top of the head of the wearer can simultaneously be shot by the imaging camera. Further, based on the shot image, the wearing condition parameter related to the wearing condition viewed from the front of the wearer and the wearing condition parameter related to the wearing condition viewed from the top of the head of the wearer can be calculated with the calculation device.

It should be noted that if the side mirror is provided, the wearing condition viewed from the front of the wearer, the wearing condition viewed from the top of the head of the wearer, and the wearing condition viewed from the side of the head of the wearer can simultaneously be shot with the imaging camera, and the wearing condition parameter related to the wearing condition viewed from the front of the wearer, the wearing condition parameter related to the wearing condition viewed from the top of the head of the wearer, and the wearing condition parameter related to the wearing condition viewed from the side of the head of the wearer can be calculated from the shot image. Further, if the wearer inclines his or her head, it is also possible to move the mirror or rotate the mirror with respect to the optical axis of the imaging camera in accordance with the inclination of the head so that the wearing condition viewed from the top of the head of the wearer can be shot from the front of the wearer.

According to another aspect of the invention, there is provided a wearing condition parameter measurement method for a spectacle lens adapted to measure at least one wearing condition parameter necessary for manufacturing spectacles including the steps of (a) providing a wearing condition parameter measurement device for a spectacle lens according to any one of the above configurations of the invention, (b) locating the mirror so that the wearing condition of the wearer viewed from a direction different from a front of the wearer can be shot with the imaging camera by reflecting the wearing condition on the mirror surface by moving a position of at least one of the wearer wearing a spectacle frame and the imaging camera to thereby locate the imaging camera in front of the wearer so that the optical axis of the imaging camera and a direction of a face of the wearer become parallel to each other, (c) shooting simultaneously the wearing condition viewed from the front of the wearer, and the wearing condition of the wearer viewed from the direction different from the front of the wearer, which is reflected on the mirror surface of the mirror, using the imaging camera, and (d) calculating the wearing condition parameter based on the shot image obtained in step (c).

The wearing condition parameter measurement device reflects the wearing condition of the wearer viewed from the direction different from the front of the wearer on the mirror as described above. Further, since the mirror is tilted so that the wearing condition viewed from the direction different from the front of the wearer can be shot from the front of the wearer, the wearing condition of the front of the wearer and the wearing condition viewed from the direction different from the front can simultaneously be shot with the imaging camera disposed in front of the wearer. Since the wearing condition viewed from two or more directions can simultaneously be shot with a single imaging camera using such a wearing condition parameter measurement device, the process such as calibration necessary in the case of shooting the wearing conditions in a plurality of directions with respective cameras can be omitted. Further, since the time and effort can be saved, the measurement can easily be performed without causing the customer pain.

Further, since in the locating step (step (b)) the head of the wearer can be located in a natural condition with no external force acting thereon, a more natural condition of the wearer in the distance vision state or the near vision state can be shot. Therefore, the highly accurate parameters including the visual motion of the wearer in daily life can be measured. Since the spectacles are adjusted based on the parameters obtained in such a manner as described above, the spectacles comfortable for the wearer can be provided.

In the wearing condition parameter measurement method for a spectacle lens, it is preferable that in the locating step (step (b)), the imaging camera is disposed out of a visual axis of the wearer.

If the wearer is in the distance vision state, the wearer looks at the area behind the imaging camera. Therefore, if the imaging camera is located on the sight line, the wearer fails to be in the distance vision state in a natural manner. According to this aspect of the invention, since the imaging camera is disposed out of the visual axis of the wearer, the imaging camera is not located on the sight line of the wearer.

Therefore, the measurement can be performed while the wearer is in a more natural condition, and the spectacles more comfortable for the wearer can be provided.

Further, since the angle and scale size of the shot image are the same irrespective of whether the imaging camera is located on the visual axis or located out of the visual axis, the calculation of the parameter is not affected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be explained with reference to the accompanying drawings.

In the present embodiments various parameters are measured in a condition in which the spectacle wearer wears the spectacles with dummy lenses mounted in the spectacle frame to be actually used.

First Embodiment

1. Parameters

The parameters measurable in the first embodiment will be explained with reference to FIGS. 1 and 2.

Figure 1:
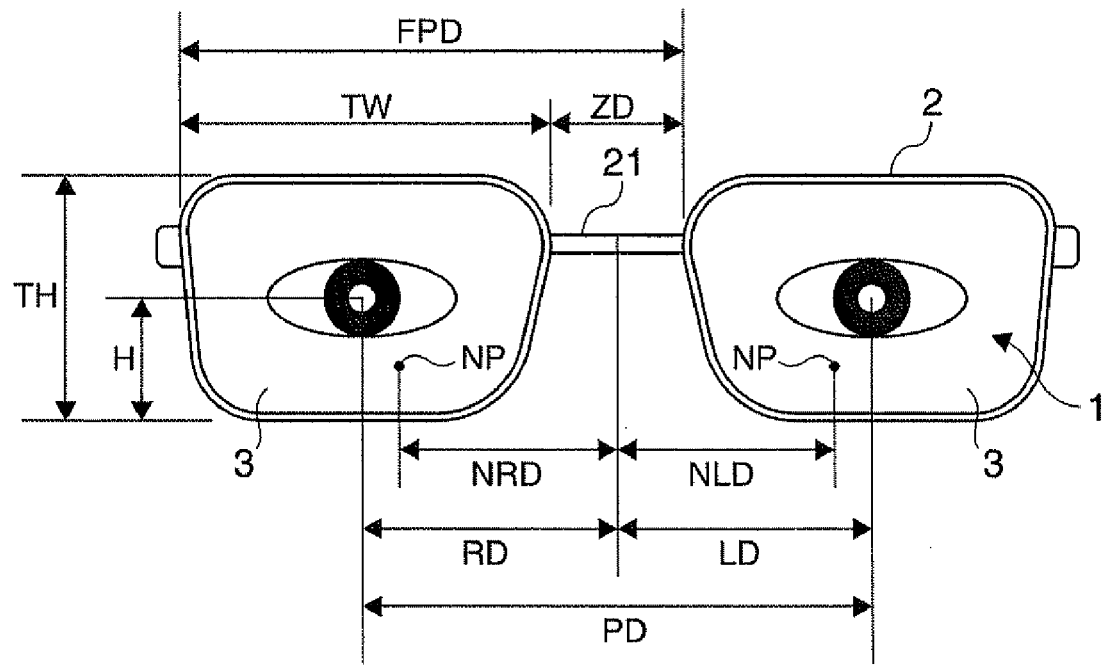
FIG. 1 is a diagram showing parameters measurable from a front image data shot in a first embodiment of the invention.

FIG. 1 shows a shot image obtained by shooting a wearer 1 in the distance vision state from the front. The parameters measurable from the shot image are a fitting point height H, a pupillary distance PD, a right eye monocular pupillary distance RD, a left eye monocular pupillary distance LD, a lens width TW, a lens distance ZD, a frame PD (FPD), and a lens height TH.

The fitting point height H denotes the distance from the center of the pupil to the lower hem of the spectacle lens 3 in the case in which the wearer 1 is in the distance vision state.

The pupillary distance PD denotes the distance between the centers of the right and left pupils when the wearer 1 is in the distance vision state.

The right eye monocular pupillary distance RD denotes the distance from the center of the pupil of the right eye to the center of a bridge 21 of a pair of spectacles 2 when the wearer 1 is in the distance vision state. The left eye monocular pupillary distance LD denotes the distance from the center of the pupil of the left eye to the center of the bridge 21 of the spectacles 2 when the wearer 1 is in the distance vision state.

The lens width TW denotes the width of the lens shape of the spectacle lens 3.

The lens distance ZD denotes the distance between the right and left spectacle lenses 3, namely the width of the bridge 21.

The frame PD (FPD) denotes the length obtained by adding the lens width TW of the spectacle lens 3 and the lens distance ZD to each other.

The lens height TH denotes the height of the lens shape of the spectacle lens 3.

Further, FIG. 1 shows near eye points NP to be the position through which the sight line passes when the wearer 1 is in the near vision state. The near eye points NP can be obtained from the shot image obtained by shooting the wearer 1 in the near vision state from the sight line direction, but are shown in FIG. 1 for the sake of explanation of the parameters.

The parameters measurable using the near eye points NP are a near vision right eye monocular pupillary distance NRD and a near vision left eye monocular pupillary distance NLD.

The near vision right eye monocular pupillary distance NRD denotes the distance from the center of the pupil of the right eye to the center of the bridge 21 of the spectacles 2 when the wearer 1 is in the near vision state. The near vision left eye monocular pupillary distance NLD denotes the distance from the center of the pupil of the left eye to the center of the bridge 21 of the spectacles 2 when the wearer 1 is in the near vision state.

Figure 2:
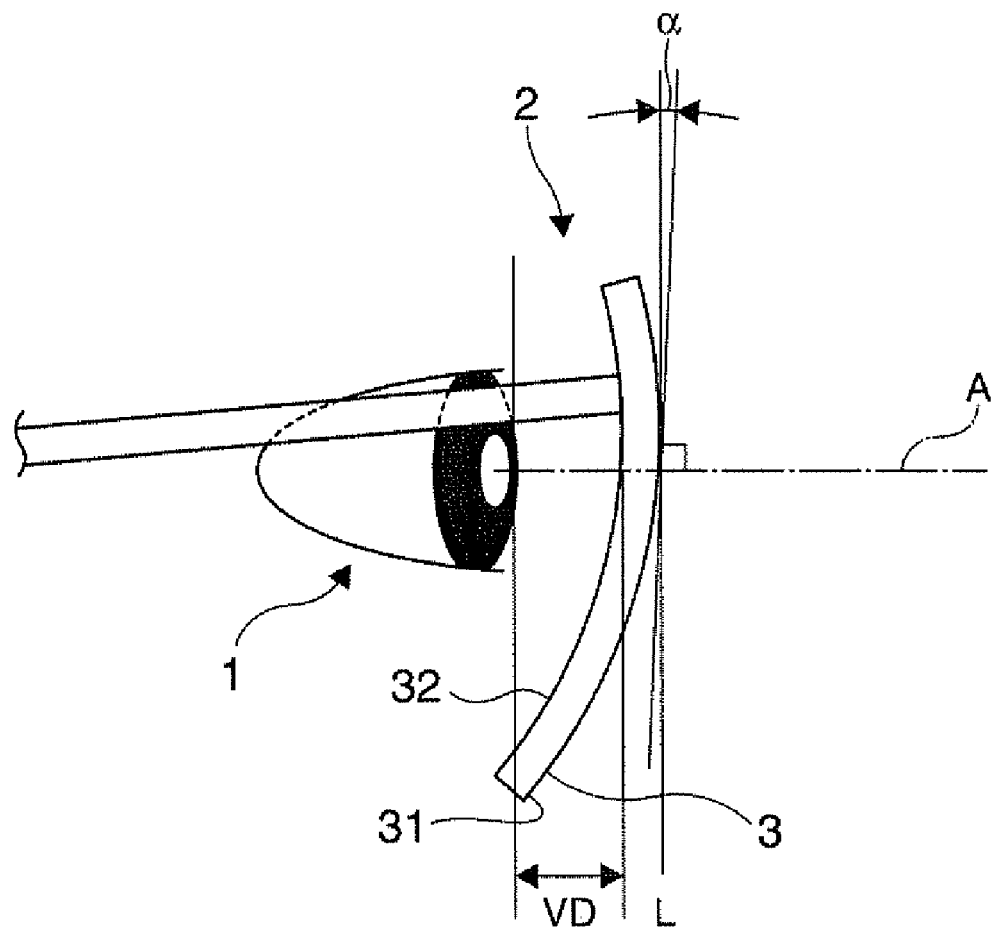
FIG. 2 is a diagram showing parameters measurable from a side image data shot in the first embodiment of the invention.

Further, the parameters measurable based on the shot image obtained by shooting the side view of the wearer 1 shown in FIG. 2 are the pantoscopic angle $\alpha$ and the vertex distance VD.

Assuming that the visual axis of the wearer 1 in the distance vision state is a distance vision axis A, and the straight line bisecting the distance vision axis A at right angles on the outer surface 31 of the spectacle lens 3 is a straight line L, the pantoscopic angle $\alpha$ is the angle formed between the straight line L and the tangential line of the outer surface 31 (the lens shape) of the spectacle lens 3 at the intersection between the distance vision axis A and the straight line L.

The vertex distance VD is the distance from the inner surface 32 of the spectacle lens 3 to the vertex of cornea of the wearer 1 along the distance vision axis A.

2. Configuration of Wearing Condition Parameter Measurement Device 10

Figure 3:
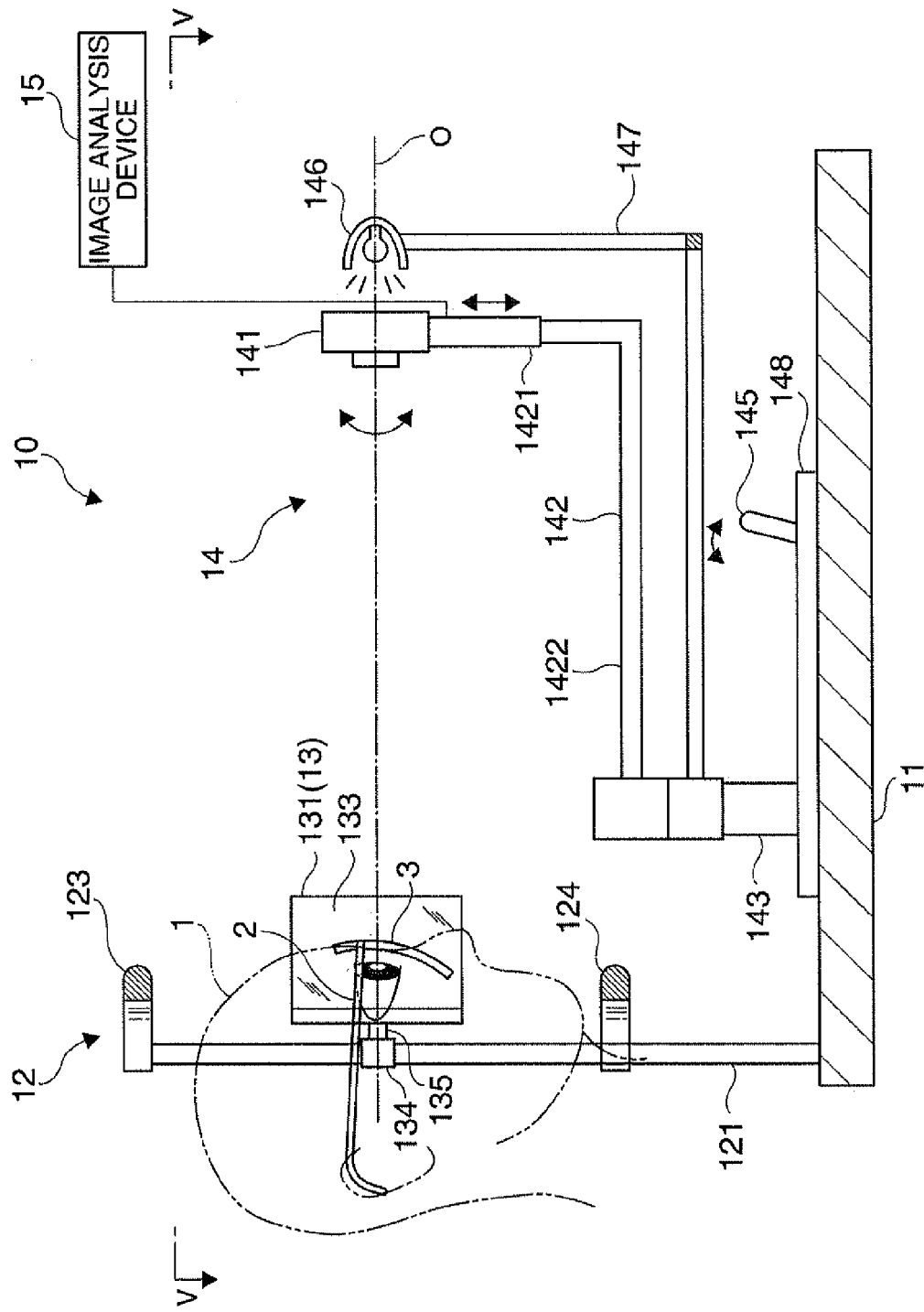
FIG. 3 is a side cross-sectional view showing a wearing condition parameter measurement device according to the first embodiment of the invention.

As shown in FIG. 3, the wearing condition parameter measurement device 10 is provided with a tabular substrate 11, a wearer locating section 12 erected on the substrate and for locating the head of the wearer, two side mirrors 13 as the mirrors attached to the wearer locating section 12, an imaging section 14 disposed in front of the wearer 1, and an image analysis device 15 as a computing device for analyzing the shot image thus shot to thereby calculate the various parameters.

Figure 4:
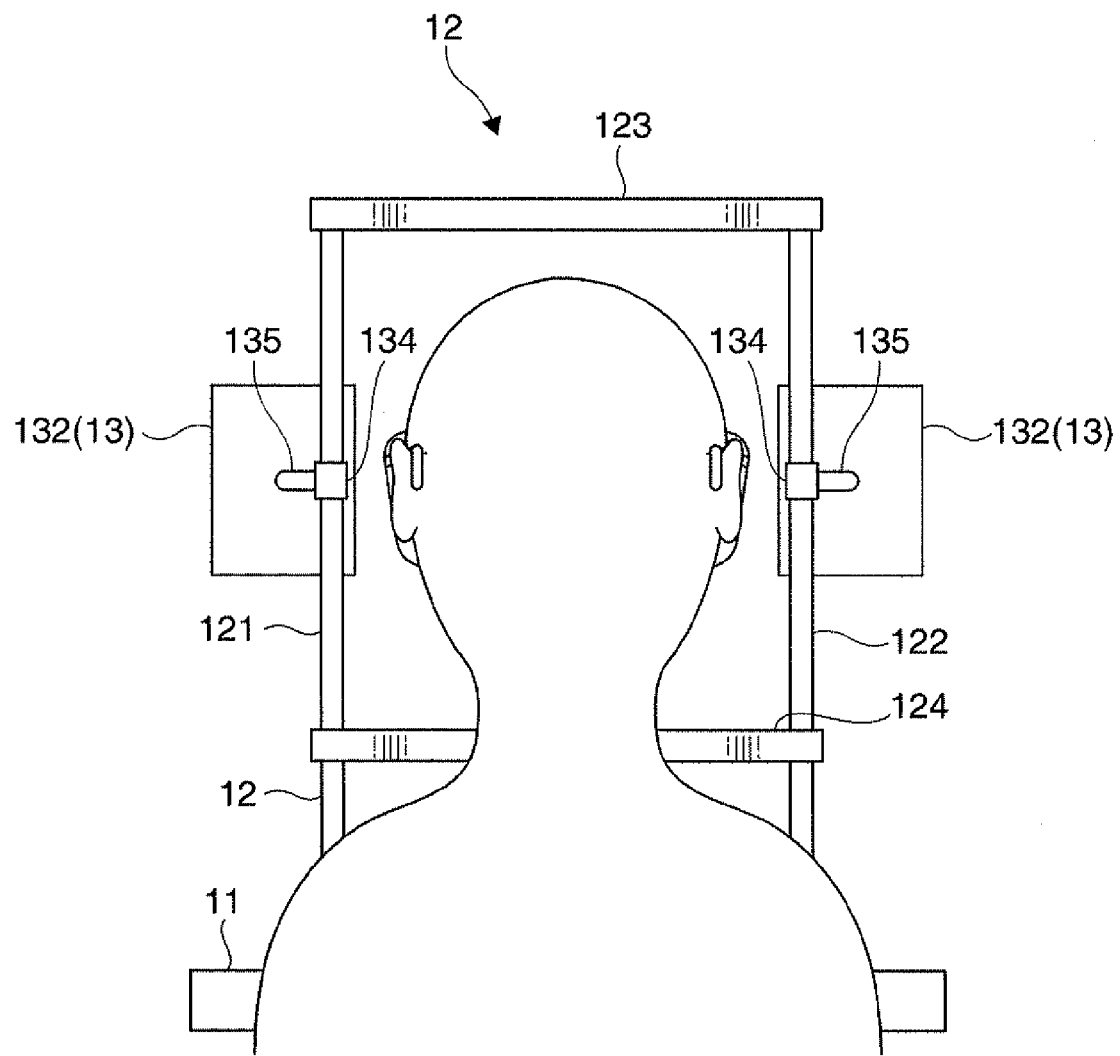
FIG. 4 is a side view showing the state in which the head of the wearer is disposed in the wearing condition parameter measurement device according to the first embodiment of the invention.

As shown in FIG. 4, the wearer locating section 12 has a right column 122 and a left column 121 erected on the substrate 11 in parallel to each other, an upper guide 123 for linking an end of the right column 121 and an end of the right column 122, and a lower guide 124 disposed in parallel to the upper guide 123.

The distance between the right column 122 and the left column 121 is in a length range of accommodating the width of the head of the wearer 1.

Figure 5:
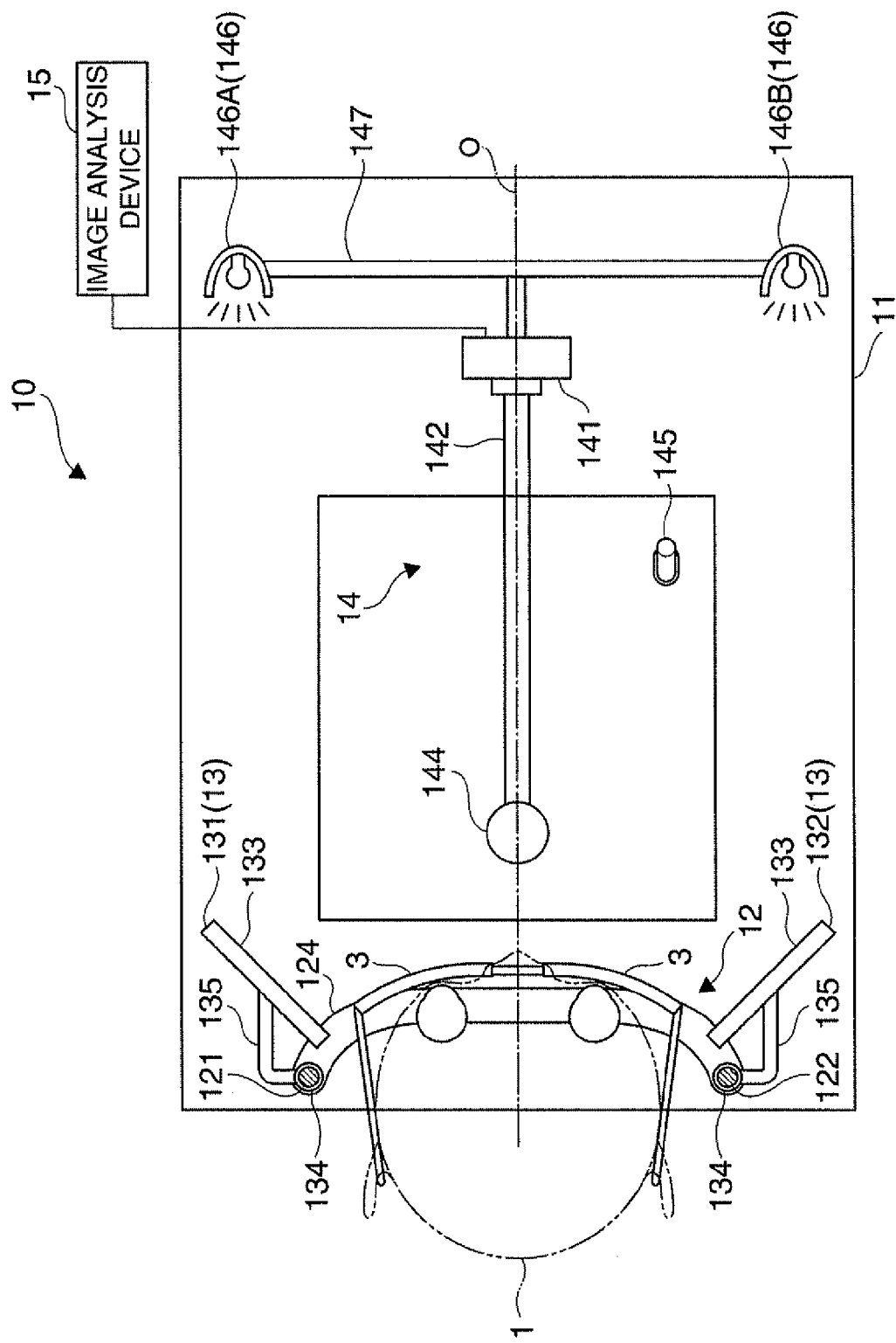
FIG. 5 is a cross-sectional view along the line V-V shown in FIG. 3.

The upper guide 123 and the lower guide 124 are each an elongated member disposed perpendicularly to both of the right column 122 and the left column 121. As shown in FIG. 5, the upper guide 123 and the lower guide 124 are each formed to have a shape curved so that the center portion thereof protrudes toward the imaging section 14 from the right column 122 and the left column 121. Further, the distance between the upper guide 123 and the lower guide 124 is in a distance range of accommodating the height of the head of the wearer 1.

In such a manner as described above, a rectangular frame is formed of the right column 122, the left column 121, the upper guide 123, and the lower guide 124 (see FIG. 4). The wearer 1 locates his or her head inside the rectangular frame. Since the upper guide 123 and the lower guide 124 are curved, the wearer 1 easily locates his or her face forward along the curved shape.

The side mirror 13 is composed of a right side mirror 132 and a left side mirror 131. The right side mirror 132 and the left side mirror 131 have the same configurations although bilaterally symmetrical with each other, and will therefore be referred to as the side mirror 13 in the explanation.

The side mirror 13 has a smooth mirror surface 133, and is attached to the right column 122 or the left column 121 with an attachment member 134 having a cylindrical shape fitted to the right column 122 or the left column 121, and a rotatable support section 135 formed integrally with the attachment member 134. The rotatable support section 135 is coupled to a surface of the side mirror 13 opposite to the mirror surface 133, and supports the side mirror 13 in a manner rotatable around the coupling position. Thus, the mirror surface 133 is arranged to be changed in the tilt angle with respect to the optical axis O of an imaging camera 141. The wearing condition on the side of the wearer 1 is reflected on the mirror surface 133, and the tilt angle is set so that the side wearing condition can be shot from the front of the wearer 1. Although the tilt angle is appropriately adjusted to the angle with which the wearing condition on the side of the wearer 1 can be shot by the imaging camera 141, in order for performing the parameter calculation easily and correctly, it is the most preferable that the angle formed between the plane having the optical axis O of the imaging camera 141 as the normal line and the mirror surface 133 is 45°. However, in actual measurement, there is a possibility that some angle error is caused when measuring natural conditions, or there are some cases in which the measurement is not achievable with the fixed angle of 45° due to an atypical face structure. In order for correcting the above, it is practicable to provide a movable range of about ±15°. Therefore, the tilt angle is preferably no smaller than 30° and no larger than 60°.

It should be noted that the attachment position of the attachment member 134 to the right column 122 or the left column 121 can arbitrarily be adjusted in accordance with the eye positions of the wearer 1.

The imaging section 14 has the imaging camera 141 disposed in front of the wearer 1, a camera arm 142 and a support section 143 both for supporting the imaging camera 141, a joystick 145 for controlling the operation of the camera arm 142, two light sources 146 for irradiating the wearer 1 with the light, a light source arm 147, and a stage 148.

The imaging camera 141 is a camera having an imaging lens such as a digital camera. The imaging camera 141 is arranged so that the shooting direction can be changed in an upward and forward direction and a downward and forward direction. As shown in FIG. 3, the imaging camera 141 is preferably disposed at the position where the optical axis thereof and the visual axis of the wearer 1 in the distance vision state are in the same level. However, since the wearer 1 in the distance vision state views an object located behind the imaging camera 141, if the imaging camera 141 is located on the visual axis, it is difficult to become in the natural distance vision state. Therefore, in reality, the imaging camera 141 is disposed above or below the visual axis of the wearer 1, and at the position where the distance vision of the wearer 1 is not hindered. Further, the shooting direction is changed so that the imaging lens of the imaging camera 141 shoots the eyes of the wearer 1.

The camera arm 142 links the imaging camera 141 and the support section 143, and is provided with a movable arm 1421 and a fixed arm 1422. The movable arm 1421 has the imaging camera 141 attached to one of the end sections thereof, and the other of the end sections has a configuration capable of moving up and down with respect to the fixed arm 1422. Specifically, the movable arm 1421 is formed to have a cylindrical shape, and one end of the fixed arm 1422 is inserted along the inner periphery thereof. Further, although not shown in the drawings, the movable arm 1421 is electrically connected to the joystick 145, and can be moved up and down by taking out and putting in the end portion of the fixed arm 1422 inserted in the inner periphery of the movable arm 1421 in accordance with the operation of the joystick 145. The fixed arm 1422 has the other end attached to the support section 143.

The support section 143 is erected on the stage 148, and supports the camera arm 142 and the light source arm 147.

The joystick 145 is electrically connected to the movable arm 1421 to thereby control the operation of the movable arm 1421. Specifically, when the joystick 145 is moved leftward in FIG. 3, the movable arm 1421 moves upward. Further, when the joystick 145 is moved rightward in FIG. 3, the movable arm 1421 moves downward.

As shown in FIG. 5, the light source 146 is composed of a pair of light sources, namely a left light source 146A and a right light source 146B. The left light source 146A is disposed in left front of the wearer 1 and behind the imaging camera 141. The right light source 146B is disposed in right front of the wearer 1 and behind the imaging camera 141. These two light sources 146A, 146B are linked to the support section 143 via the light source arm 147, and are thus supported. The light source 146 irradiates the wearer 1 with the light.

The image analysis device 15 is for taking in the data of the shot image shot by the imaging camera 141, and then measuring the various parameters based on the shot image data, and a personal computer having the image analysis software generally used for measuring the various parameters of the spectacles installed can be used as the image analysis device 15. In other words, the image analysis device 15 is mainly composed of an input section capable of inputting the shot image data and various information, an output section such as a display for outputting the measurement result and so on, an operation section such as a CPU for performing arithmetic processing, and a storage section for storing various data. The image analysis software is stored in the storage section, and the operation section performs the measurement of the various parameters with the image analysis software stored in the storage section.

3. Measurement Method with Wearing Condition Parameter Measurement Device 10

Figure 6:
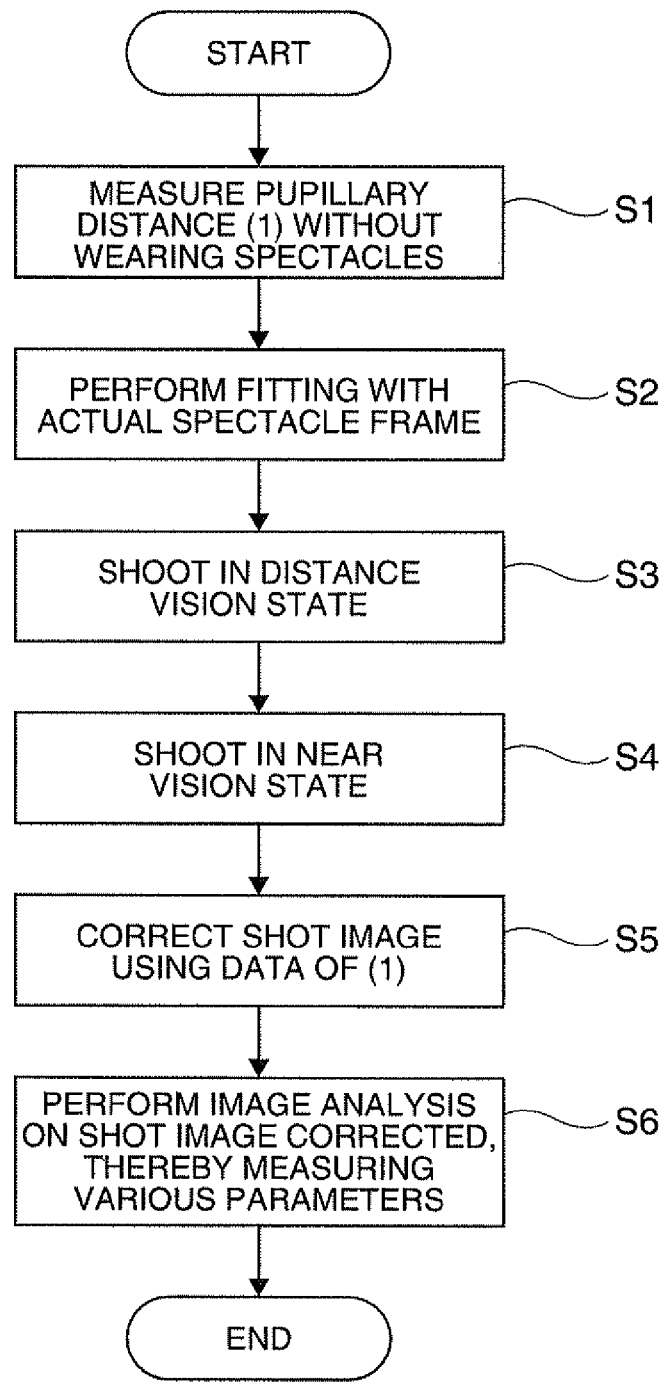
FIG. 6 is a flowchart showing the procedure of measuring the wearing condition parameter using the wearing condition parameter measurement device according to the first embodiment of the invention.

Then, the method of measuring the various parameters using the wearing condition parameter measurement device 10 will be explained with reference to the flowchart shown in FIG. 6.

Firstly, the pupillary distance of the wearer 1 without wearing the spectacles in each of the distance vision state and the near vision state is measured (S1).

Specifically, in the condition in which the wearer does not wear the spectacles, the measurement is performed using a general pupillary distance meter (PD meter).

Subsequently, fitting of the spectacles having dummy lenses mounted to the frame to be actually worn is performed by the wearer 1 (S2).

Then, the wearer 1 is located at the position where the eyes of the wearer 1 are reflected on the side mirrors 13 of the wearer locating section 12 of the measurement device 10, and is made to be in the distance vision state. When making the wearer 1 be in the distance vision state, an object to be the target is disposed behind the imaging camera 141. Then, the imaging camera 141 is moved downward by operating the joystick 145 so that the imaging camera 141 has no intersection with the distance vision axis of the wearer 1, and the imaging lens of the imaging camera 141 is trained on the wearer 1. Here, after adjusting the positions and the tilt angles of the side mirrors 13 so that the wearing condition on the side of the wearer 1 is reflected on the side mirrors 13, the face (in particular, the eye portion) of the wearer 1 and the side mirrors 13 on the both sides are shot by the imaging camera 141 at the same time (S3).

Figure 7:
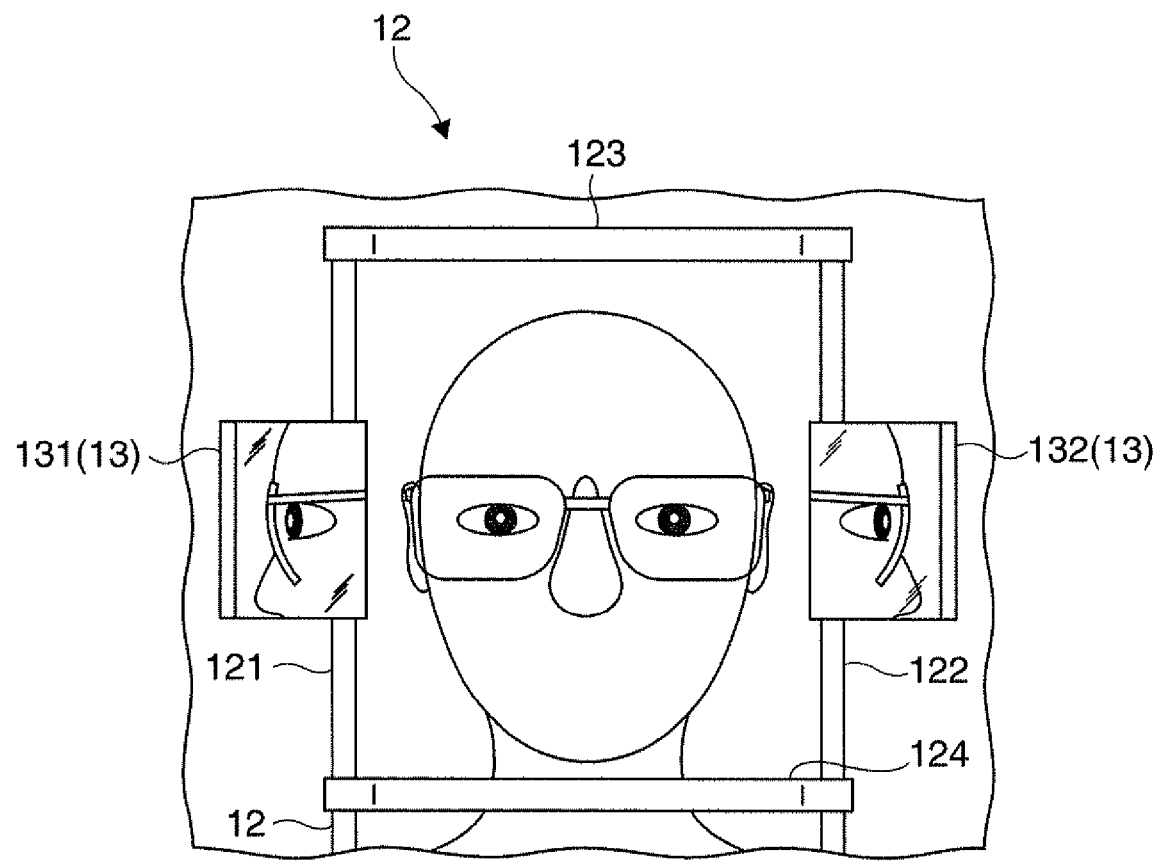
FIG. 7 is a diagram showing shot images shot by the wearing condition parameter measurement device according to the first embodiment of the invention.

Here, the shot image thus shot is shown in FIG. 7. As shown in FIG. 7, the wearing condition on the front of the wearer 1 and the wearing condition on the right and left thereof reflected on the side mirrors 13 are displayed simultaneously.

Subsequently, the wearer 1 is made to be in the near vision state, then the joystick 145 is operated to move the imaging camera 141 downward to the extent that the pupils of the wearer 1 can be checked, and then the face (in particular, the eye portion) of the wearer 1 and the side mirrors 13 on the both sides are shot (54) by the imaging camera 141 simultaneously.

Then, the data of the shot image thus shot is input from the input section of the image analysis device 15, and a correction value of the shot image data thus input is obtained (S5) based on the pupillary distance measured in the step S1.

Specifically, the correction coefficients are obtained using the formulas (1), (2), and (3) below.

(front image correction coefficient)=(distance pupillary distance (PD) of the image data obtained in the step S3)÷(distance pupillary distance (PD) of the actual measurement value obtained in the step S1)  (1)

(mirror correction coefficient)=((shooting distance)+(distance between the front image pupil center and the side mirror center))÷(shooting distance)  (2)

(side image correction coefficient)=(front image correction coefficient)×(mirror correction coefficient)  (3)

The wearing condition parameters related to the wearing condition viewed from the front can be obtained by multiplying the measurement values of the distances obtained from the image by the front image correction coefficient. Further, the wearing condition parameters related to the wearing condition shot with the side mirrors can be obtained by multiplying the measurement values of the distances obtained from the image by the side image correction coefficient. Naturally, no correction is necessary for the parameters related to angles. It should be noted that the mirror correction coefficient is an example of the coefficient for correcting the optical path difference between the distance from the camera to the wearer and the distance from the camera to the image of the wearer reflected on the mirror.

Further, the various parameters are measured (S6) using the image analysis device 15 based on the shot image data thus corrected. Specifically, the image measurement data is corrected using the image correction coefficients described above.

The measurement result is displayed on the display of the image analysis device 15.

4. Functions and Advantages of First Embodiment

According to the first embodiment described above, the following functions and advantages can be obtained.

Since the wearing condition parameter measurement device 10 is provided with the side mirrors 13 disposed on the both sides of the wearer 1, the wearing condition on the side of the wearer 1 is reflected on the mirror surfaces 133, and thus it is possible to shoot the wearing condition on the side thereof reflected on the mirror surfaces 133 from the front. In other words, the front wearing condition of the wearer 1 and the side wearing condition thereof can simultaneously be shot by a single imaging camera 141 from the front. Therefore, in contrast to the conventional method in which the front wearing condition and the side wearing condition are separately shot with the respective cameras and therefore the processes are complicated due to, for example, the calibration, there is no need for performing the calibration, and it is possible to easily perform the shooting and the measurement without time and effort.

Therefore, since there is no need to make the customer as the wearer 1 use time or have a trouble, the easy and prompt measurement can be performed without causing the customer pain.

The wearer locating section 12 forms the rectangular frame with the left column 121, the right column 122, the upper guide 123, and the lower guide 124, and locates the head of the wearer 1 inside the frame. The wearer 1 is not fixed in the head or the face, and therefore, can become in the distance vision state or the near vision state in a natural condition without the external force acting on the head of the wearer. Therefore, the highly accurate parameters with the visual motion of the wearer 1 in daily life reflected on the spectacle adjustment can be measured. According to the spectacles adjusted based on the parameters obtained in such a manner as described above, the spectacle lenses comfortable for the wearer 1 can be provided.

Further, since the various parameters are measured using the frame to be actually worn by the wearer 1, the wearing condition of the individual can be reproduced with high accuracy by using these parameters, and thus the spectacle adjustment best suited to the wearer 1 can be performed.

Further, the wearing condition parameter measurement device 10 has the configuration easily constituted by assembling the constituents, and therefore can be prepared at low cost, and is superior in economic efficiency.

Second Embodiment

Figure 8:
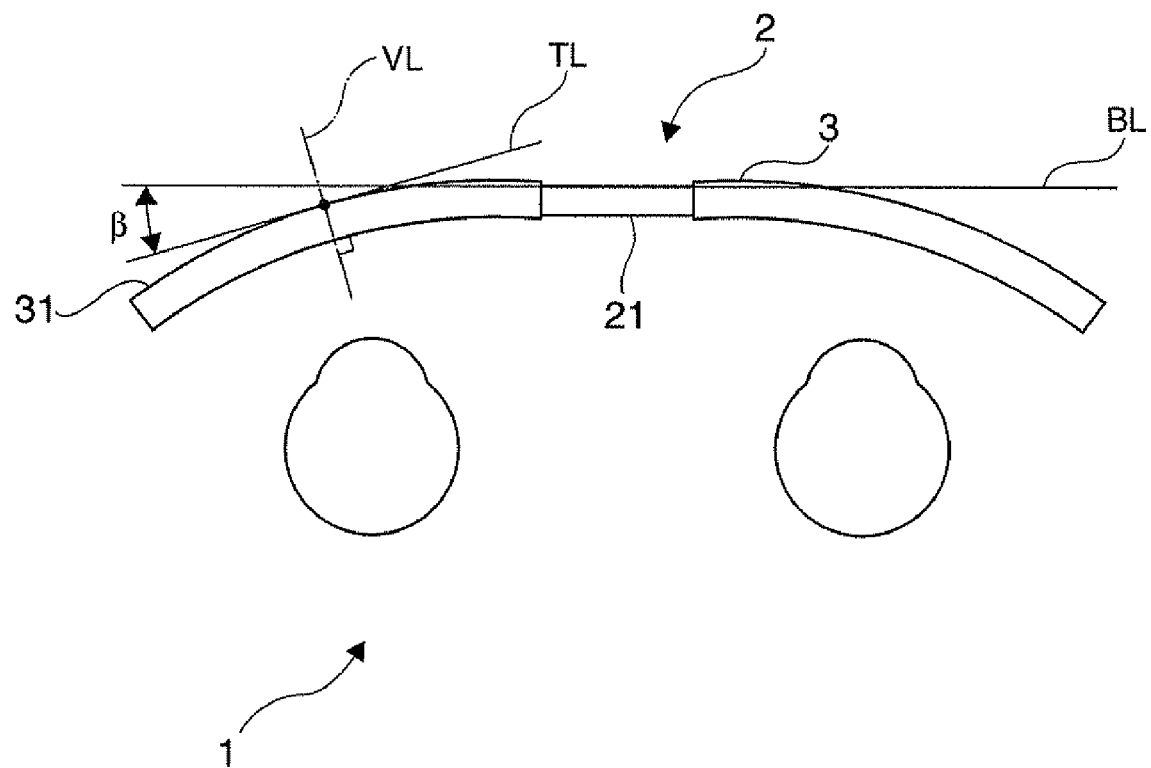
FIG. 8 is a diagram showing parameters measurable from a top image data shot in a second embodiment of the invention.

In the second embodiment, various parameters shown in FIGS. 1, 2, and 8 are measured in a condition in which the spectacle wearer wears the spectacles with dummy lenses mounted in the spectacle frame to be actually used by the wearer.

1. Parameters

Since the parameters shown in FIGS. 1 and 2 are the same as those in the first embodiment, the various parameters shown in FIG. 8 will be explained.

As shown in FIG. 8, the parameter measurable based on the shot image obtained by shooting the top wearing condition of the wearer 1 is the frame camber angle β.

The frame camber angle β is an angle formed between a straight line BL along the bridge 21 of the spectacles 2 and a tangential line TL of the outer surface 31 of the lens shape of the spectacle lens 3 at the intersection between the outer surface 31 and the vertical center line VL of the lens shape.

2. Configuration of Wearing Condition Parameter Measurement Device 20

The wearing condition parameter measurement device 20 according to the second embodiment has substantially the same configuration as the first embodiment except the point that a top mirror 18 is further disposed above the wearer 1. The constituents substantially the same as those of the first embodiment will be omitted from the explanation.

Figure 9:
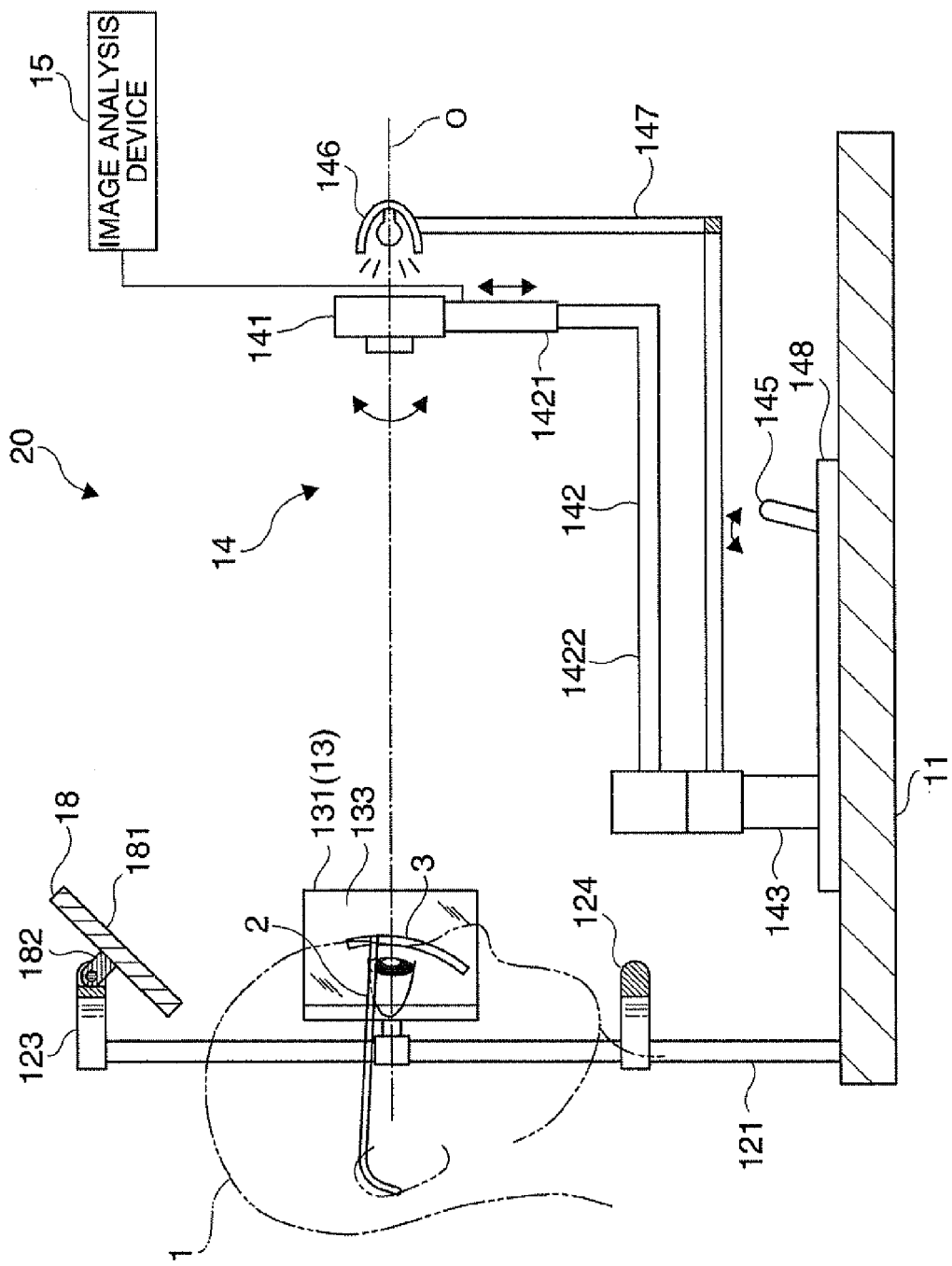
FIG. 9 is a side cross-sectional view showing a wearing condition parameter measurement device according to the second embodiment of the invention.

As shown in FIG. 9, the top mirror 18 has a smooth mirror surface 181, and is supported in a rotatable manner by a rotatable attachment member 182 attached to the upper guide 123 of the wearer locating section 12. The wearing condition on the top of the wearer 1 is reflected on the mirror surface 181, and the tilt angle is set so that the top wearing condition reflected on the mirror surface 181 can be shot from the front of the wearer 1. Although the tilt angle with respect to the optical axis O of the imaging camera 141 can arbitrarily be adjusted, in order for performing the parameter calculation with ease and accuracy, it is the most preferable that the angle formed between the plane having the optical axis O of the imaging camera 141 as the normal line thereof and the mirror surface 181 is 45°. However, in actual measurement, there is a possibility that some angle error is caused when measuring natural conditions, or there are some cases in which the measurement is not achievable with the fixed angle of 45 degrees due to an atypical face structure. In order for correcting the above, it is practicable to provide a movable range of about ±15°. Therefore, the tilt angle is preferably no smaller than 30° and no larger than 60°. If the tilt angle is within the range described above, the upper wearing condition of the wearer 1 can clearly be shot.

3. Measurement Method with Wearing Condition Parameter Measurement Device 20

The method of measuring the various parameters using the wearing condition parameter measurement device 20 is substantially the same as that of the first embodiment, but is different therefrom in the operation in the steps S3 and S4 and in the shot image thus shot.

Specifically, after the wearer 1 performs (S2) fitting with the frame to be actually worn by the wearer 1, the wearer 1 is located at the position where the side wearing condition of the wearer 1 is reflected on the side mirrors 13 of the wearer locating section 12 of the measurement device 20, and then the wearer 1 is made to become in the distance vision state. Then, the joystick 145 is operated to move the imaging camera 141 to the position where the imaging camera 141 has no intersection with the distance vision axis of the wearer 1, and the imaging lens of the imaging camera 141 is trained on the wearer 1. Here, the tilt angles of the side mirrors are adjusted so that the condition in which the side wearing condition of the wearer 1 is reflected on the side mirrors 13 is realized. Further, the tilt angle of the top mirror is adjusted so that the condition in which the top wearing condition of the wearer 1 is reflected on the top mirror 18 is realized. Then, the face (in particular, the eye portion) of the wearer 1, the side mirrors 13 on the both sides, and the top mirror 18 are shot simultaneously (S3). The shot image thus shot is shown in FIG. 10.

Figure 10:
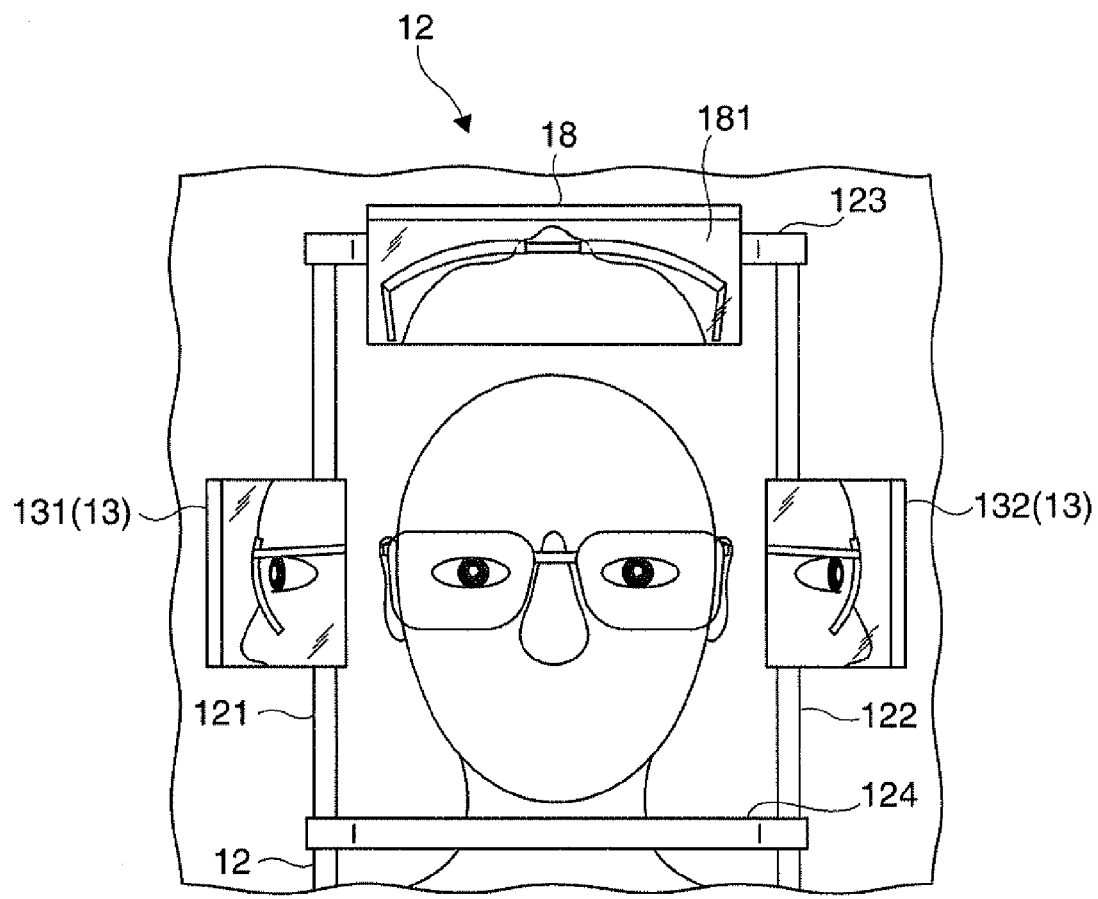
FIG. 10 is a diagram showing shot images shot by the wearing condition parameter measurement device according to the second embodiment of the invention.

As shown in FIG. 10, the wearing condition on the front of the wearer 1, the wearing condition on the right and left thereof reflected on the side mirrors 13, and the top wearing condition reflected on the top mirror 18 are displayed simultaneously.

Subsequently, the wearer 1 is made to be in the near vision state, then the joystick 145 is operated to move the imaging camera 141 downward to the extent that the pupils of the wearer 1 can be checked, and then the face (in particular, the eye portion) of the wearer 1, the side mirrors 13 on the both sides, and the top mirror 18 are shot simultaneously (S4).

After then, substantially the same process as in the first embodiment is performed.

4. Functions and Advantages of Second Embodiment

According to such a second embodiment as described above, the following functions and advantages can be obtained besides the functions and the advantages of the first embodiment.

Since the wearing condition parameter measurement device 20 is provided with the top mirror 18 disposed on the upper side of the wearer 1, the top wearing condition of the wearer 1 is reflected on the mirror surfaces 181, and thus it is possible to shoot the top wearing condition reflected on the mirror surface 181 from the front. In other words, the front wearing condition of the wearer 1, the side wearing condition thereof, and the top wearing condition thereof can simultaneously be shot by a single imaging camera 141 from the front.

Therefore, in the case of measuring the parameters of the top wearing condition of the wearer, it is possible to more easily perform the shooting and the measurement without time and effort.

Therefore, since there is no need to make the customer as the wearer 1 use time or have a trouble, the easy and prompt measurement can be performed without causing the customer pain.

MODIFIED EXAMPLES

It should be noted that it is obvious that the invention is not limited to the embodiments described above but includes modifications and improvements within a range where any of the advantages of the invention can be achieved.

For example, it is also possible to provide a scale used as a target for measuring the parameters to the mirror surface 133 of the side mirrors 13 used in the embodiments described above.

Figure 11A:
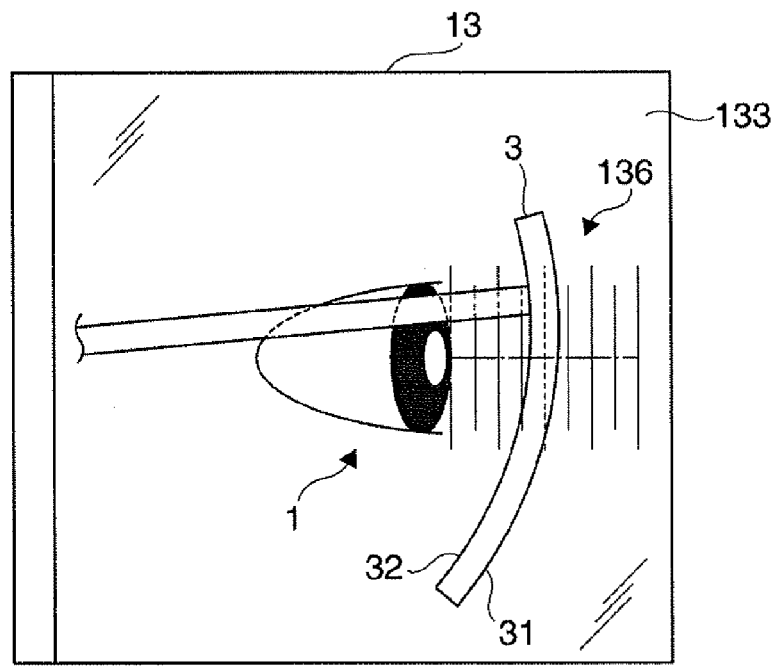
FIGS. 11A and 11B are diagrams showing a side mirror in another embodiment of the invention.

Specifically, as shown in FIG. 11A, a linear scale 136 composed of a plurality of straight lines disposed at a pitch of, for example, 1 mm is formed on the mirror surface 133. According to this linear scale 136, the vertex distance VD can easily be measured without performing the image analysis.

Figure 11B:
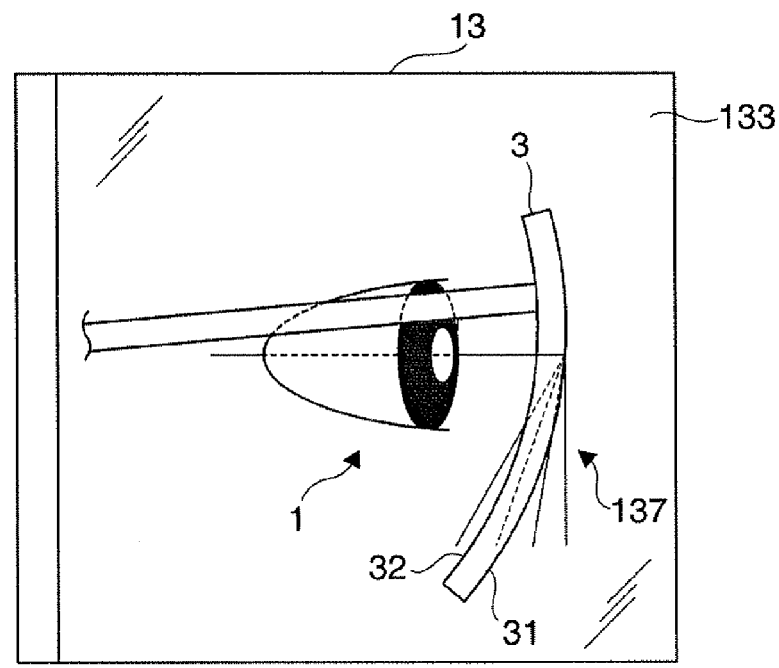

Further, as shown in FIG. 11B, an angular scale 137 composed of a plurality of straight lines disposed at a pitch of, for example, 10° with respect to a straight line extending from an arbitrary point in a vertical direction is formed on the mirror surface 133. According to this angular scale 137, the pantoscopic angle α can easily be measured without performing the image analysis.

Further, it is also possible to provide an angular scale capable of measuring the frame camber angle β to the mirror surface 181 of the top mirror 18 in a similar manner.

Further, although in the embodiments described above the side mirrors 13 are disposed on both sides of the wearer 1, it is also possible to adopt a configuration of providing the side mirror 13 to either one of the right and left sides.

The invention can be used in a glasses shop and so on.

The entire disclosure of Japanese Patent Application No: 2010-077507, filed Mar. 30, 2010 is expressly incorporated by reference herein.

What is claimed is:

1. A wearing condition parameter measurement device for a spectacle lens configured to measure at least one wearing condition parameter necessary for manufacturing spectacles, comprising: at least one mirror having a mirror surface configured to reflect the wearing condition of a wearer; an imaging camera configured to simultaneously shoot the wearer and the mirror surface reflecting the wearer to obtain a shot image; and a calculation device configured to calculate the wearing condition parameter based on the shot image obtained by the imaging camera, wherein the mirror is disposed so that an angle formed between a plane having an optical axis of the imaging camera as a normal line and the mirror surface is one of equal to and larger than 30° and one of equal to and smaller than 60°, and the mirror is a side mirror configured to reflect the wearing condition viewed from a side of a head of the wearer, and a linear scale or an angular scale composed of a plurality of straight lines is provided on the mirror surface of the side mirror.

2. The wearing condition parameter measurement device for a spectacle lens according to claim 1, wherein the angle formed between the plane having the optical axis of the imaging camera as the normal line and the mirror surface of the mirror is 45°.

3. A wearing condition parameter measurement method for a spectacle lens configured to measure at least one wearing condition parameter necessary for manufacturing spectacles, comprising: (a) providing a wearing condition parameter measurement device for a spectacle lens including at least one mirror having a mirror surface configured to reflect the wearing condition of a wearer, an imaging camera configured to simultaneously shoot the wearer and the mirror surface reflecting the wearer to obtain a shot image, and a calculation device configured to calculate the wearing condition parameter based on the shot image obtained by the imaging camera, the mirror being disposed so that an angle formed between a plane having an optical axis of the imaging camera as a normal line and the mirror surface is one of equal to and larger than 30°. and one of equal to and smaller than 60°, and the mirror being a side mirror configured to reflect the wearing condition viewed from a side of a head of the wearer, wherein a linear scale or an angular scale composed of a plurality of straight lines is provided on the mirror surface of the side mirror; (b) locating the mirror so that the wearing condition of the wearer viewed from a direction different from a front of the wearer can be shot with the imaging camera by reflecting the wearing condition on the mirror surface by moving a position of at least one of the wearer wearing a spectacle frame and the imaging camera to thereby locate the imaging camera in front of the wearer so that the optical axis of the imaging camera and a direction of a face of the wearer become parallel to each other; (c) shooting simultaneously the wearing condition viewed from the front of the wearer, and the wearing condition of the wearer viewed from the direction different from the front of the wearer, which is reflected on the mirror surface of the mirror, using the imaging camera; and (d) calculating the wearing condition parameter based on the shot image obtained in step (c).

4. The wearing condition parameter measurement method for a spectacle lens according to claim 3, wherein
in step (b), the imaging camera is disposed out of a visual axis of the wearer.

* * * * *